(12) United States Patent
Jiang et al.

(10) Patent No.: US 12,124,887 B2
(45) Date of Patent: Oct. 22, 2024

(54) MICROSERVICE MEASUREMENT AND MERGING

(71) Applicant: International Business Machines Corporation, Armonk, NY (US)

(72) Inventors: Jing Bo Jiang, Beijing (CN); Rui W W Wang, Beijing (CN); Yi Ming Wang, Shaanxi (CN); Yan Liu, Beijing (CN); Zheng Jie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/475,696

(22) Filed: Sep. 15, 2021

(65) Prior Publication Data

US 2023/0077708 A1   Mar. 16, 2023

(51) Int. Cl.
*G06F 9/50* (2006.01)
*H04L 67/00* (2022.01)
*H04L 67/75* (2022.01)

(52) U.S. Cl.
CPC ............ *G06F 9/5077* (2013.01); *H04L 67/34* (2013.01); *H04L 67/75* (2022.05)

(58) Field of Classification Search
None
See application file for complete search history.

(56) References Cited

U.S. PATENT DOCUMENTS

| | | | |
|---|---|---|---|
| 10,936,291 B1 | 3/2021 | Gamliel et al. | |
| 2009/0300173 A1* | 12/2009 | Bakman | G06F 11/3452 |
| | | | 718/1 |
| 2015/0178359 A1* | 6/2015 | Grasselt | H04L 47/72 |
| | | | 707/602 |
| 2016/0248861 A1 | 8/2016 | Lawson et al. | |
| 2017/0160880 A1 | 6/2017 | Jose et al. | |
| 2017/0242784 A1* | 8/2017 | Heorhiadi | G06F 11/3684 |

(Continued)

FOREIGN PATENT DOCUMENTS

| | | |
|---|---|---|
| CN | 112256359 A | 1/2021 |
| WO | WO2019209231 A2 | 10/2019 |

OTHER PUBLICATIONS

IBM, "z/Architecture—Principles of Operation," IBM Publication No. SA22-7832-12, Thirteenth Edition, Sep. 2019, pp. 1-2000.

(Continued)

*Primary Examiner* — Tonia L Dollinger
*Assistant Examiner* — Ishrat Rashid
(74) *Attorney, Agent, or Firm* — Michael A. Petrocelli, Esq.; Rachel L. Pearlman, Esq.; Heslin Rothenberg Farley and Metsiti P.C.

(57) ABSTRACT

A method, computer program product, and system include a processor(s) generates a representation of microservice communications within a network. The processor(s) updates the representation, based on monitoring deployments of microservices within the network. The processor(s) identifies individual service clusters within the network. The processor(s) selects each cluster from the identified service clusters, and for each cluster, evaluates whether to recommend mergers of a portion of the microservices deployed to each cluster. The processor(s) recommends at least one merger for a given cluster of the identified services clusters. Based on the recommending, the processor(s) generates a what-if analysis for the at least one merger.

20 Claims, 8 Drawing Sheets

(56) References Cited

U.S. PATENT DOCUMENTS

| | | | | |
|---|---|---|---|---|
| 2017/0364434 | A1* | 12/2017 | Kairali | G06F 11/3668 |
| 2019/0104184 | A1* | 4/2019 | Gao | H04L 67/75 |
| 2019/0340059 | A1* | 11/2019 | Bagarolo | G06F 8/71 |
| 2021/0019194 | A1* | 1/2021 | Bahl | H04L 67/1031 |
| 2021/0142159 | A1* | 5/2021 | Gupta | G06N 3/0445 |
| 2022/0159549 | A1* | 5/2022 | Ushijima-Mwesigwa | H04W 84/18 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Bogner, Justus et al., "Towards Integrating Microservices with Adaptable Enterprise Architecture," 2016 IEEE 20th International Enterprise Distributed Object Computing Workshop (EDOCW) Sep. 2016, pp. 158-163.

Josélyne, Munezero Immaculée et al., "Partitioning Microservices: A Domain Engineering Approach," 2018 ACM/IEEE Symposium on Software Engineering in Africa, May 2018, pp. 43-49.

* cited by examiner

300

| | |
|---|---|
| 310 | PROGRAM CODE ASSIGNS EACH NODE IN A GIVEN NETWORK TO A CLUSTER WHICH INCREASES ITS MODULARITY THE MOST, HENCE, OPTIMIZING MODULARITY |
| 320 | PROGRAM BUILDS A NEW NETWORK WHERE NODES ARE IN THE CLUSTERS THAT OPTIMIZE MODULARITY |

| Service Name | Inter-communication | Service call to common third party | Service call to common data | Times of Auto-scaling Up concurrently | Times of Auto-scaling down concurrently | Auto-scaling Trigger (CPU, Mem) | Relevancy Score (1 – 10) | Suggest to merge |
|---|---|---|---|---|---|---|---|---|
| Service A/ B | 2 | 3 | Yes | 4 | 3 | Yes | 8 | Yes |
| Service B/ C | 3 | 1 | No | 1 | 1 | No | 4 | No |
| ... ... | | | | | | | | |
| | | | | | | | | |

FIG. 4

MICROSERVICE MEASUREMENT AND MERGING

BACKGROUND

A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. Presently, microservices are seeing increased use in these cloud computing environments. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms.

There is no industry consensus regarding the properties of microservices, and an official definition is missing as well. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the Twenty Possible Microservices Characteristics"): (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environment, depending on what fits best (herein referred to as generically-implementable microservices"); (vi) messaging enabled; (vii) bounded by contexts; (viii) autonomously developed, (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services; (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability. Employing microservices enables the breaking down of complex applications into simpler independent processes.

SUMMARY

Shortcomings of the prior art are overcome, and additional advantages are provided through the provision of a method for evaluating merger opportunities for microservices in a network. The method includes, for instance: generating, by one or more processors, based on at least one design specification, a representation of microservice communications within a network; updating, by the one or more processors, the representation, based on monitoring deployments of microservices within the network; identifying, by the one or more processors, individual service clusters within the network; selecting, by the one or more processors, each cluster from the identified service clusters, and for each cluster, evaluating, based on discovering relationships between microservices deployed to each cluster, whether to recommend mergers of a portion of the microservices deployed to each cluster; recommending, by the one or more processors, at least one merger for a given cluster of the identified services clusters; and based on the recommending, for the given cluster, generating a what-if analysis for the at least one merger.

Shortcomings of the prior art are overcome, and additional advantages are provided through the provision of a computer program product for evaluating merger opportunities for microservices in a network. The computer program product comprises a storage medium readable by a one or more processors and storing instructions for execution by the one or more processors for performing a method. The method includes, for instance: generating, by the one or more processors, based on at least one design specification, a representation of microservice communications within a network; updating, by the one or more processors, the representation, based on monitoring deployments of microservices within the network; identifying, by the one or more processors, individual service clusters within the network; selecting, by the one or more processors, each cluster from the identified service clusters, and for each cluster, evaluating, based on discovering relationships between microservices deployed to each cluster, whether to recommend mergers of a portion of the microservices deployed to each cluster; recommending, by the one or more processors, at least one merger for a given cluster of the identified services clusters; and based on the recommending, for the given cluster, generating a what-if analysis for the at least one merger.

Shortcomings of the prior art are overcome, and additional advantages are provided through the provision of a system for evaluating merger opportunities for microservices in a network. The system includes a memory, one or more processors in communication with the memory, and program instructions executable by the one or more processors via the memory to perform a method. The method includes, for instance: generating, by the one or more processors, based on at least one design specification, a representation of microservice communications within a network; updating, by the one or more processors, the representation, based on monitoring deployments of microservices within the network; identifying, by the one or more processors, individual service clusters within the network; selecting, by the one or more processors, each cluster from the identified service clusters, and for each cluster, evaluating, based on discovering relationships between microservices deployed to each cluster, whether to recommend mergers of a portion of the microservices deployed to each cluster; recommending, by the one or more processors, at least one merger for a given cluster of the identified services clusters; and based on the recommending, for the given cluster, generating a what-if analysis for the at least one merger.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts a workflow that includes various aspects of some embodiments of the present invention;

FIG. 4 depicts a table that includes various aspects of some embodiments of the present invention;

DETAILED DESCRIPTION

Figure 1:
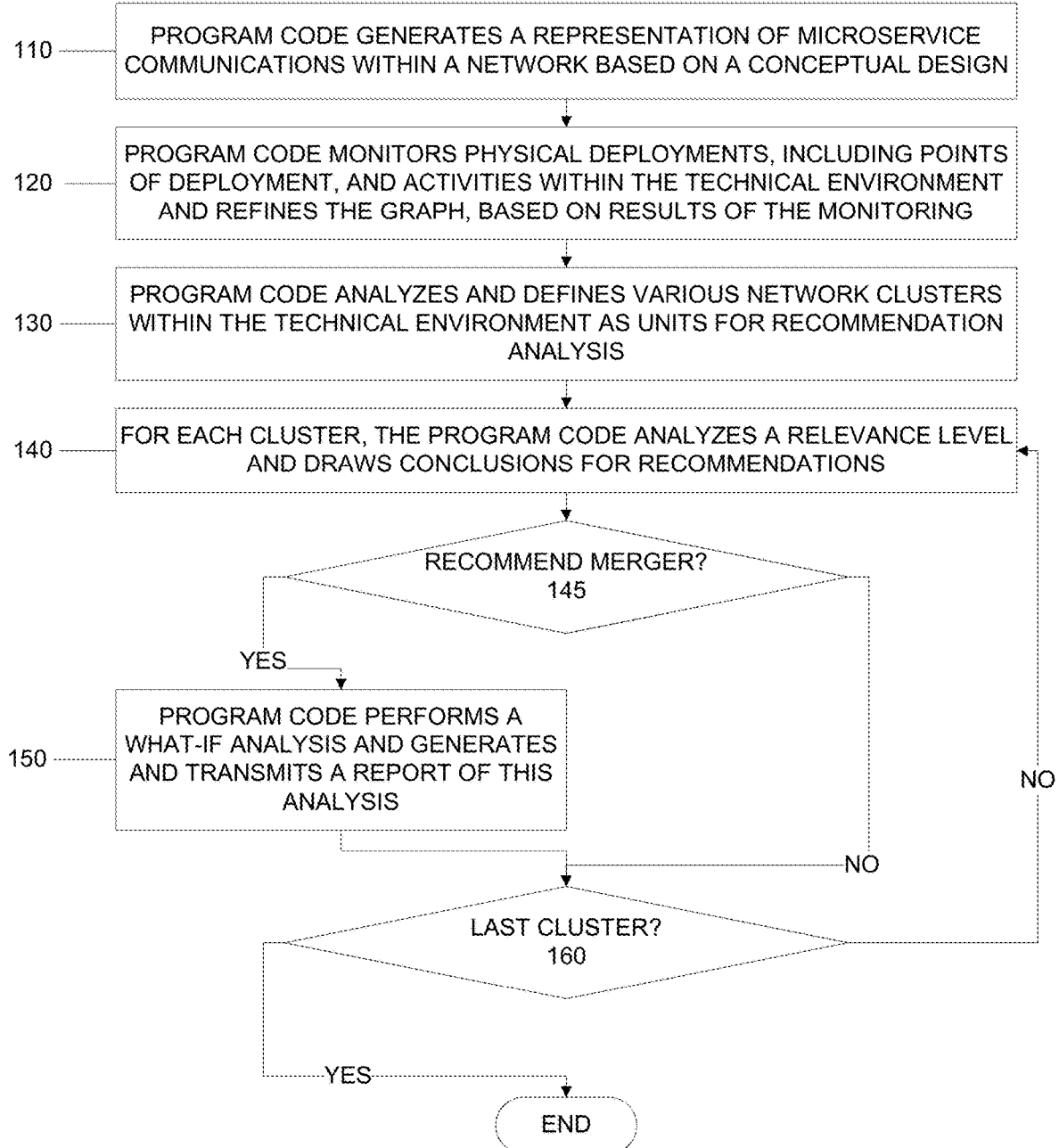
FIG. 1 depicts a workflow that includes various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
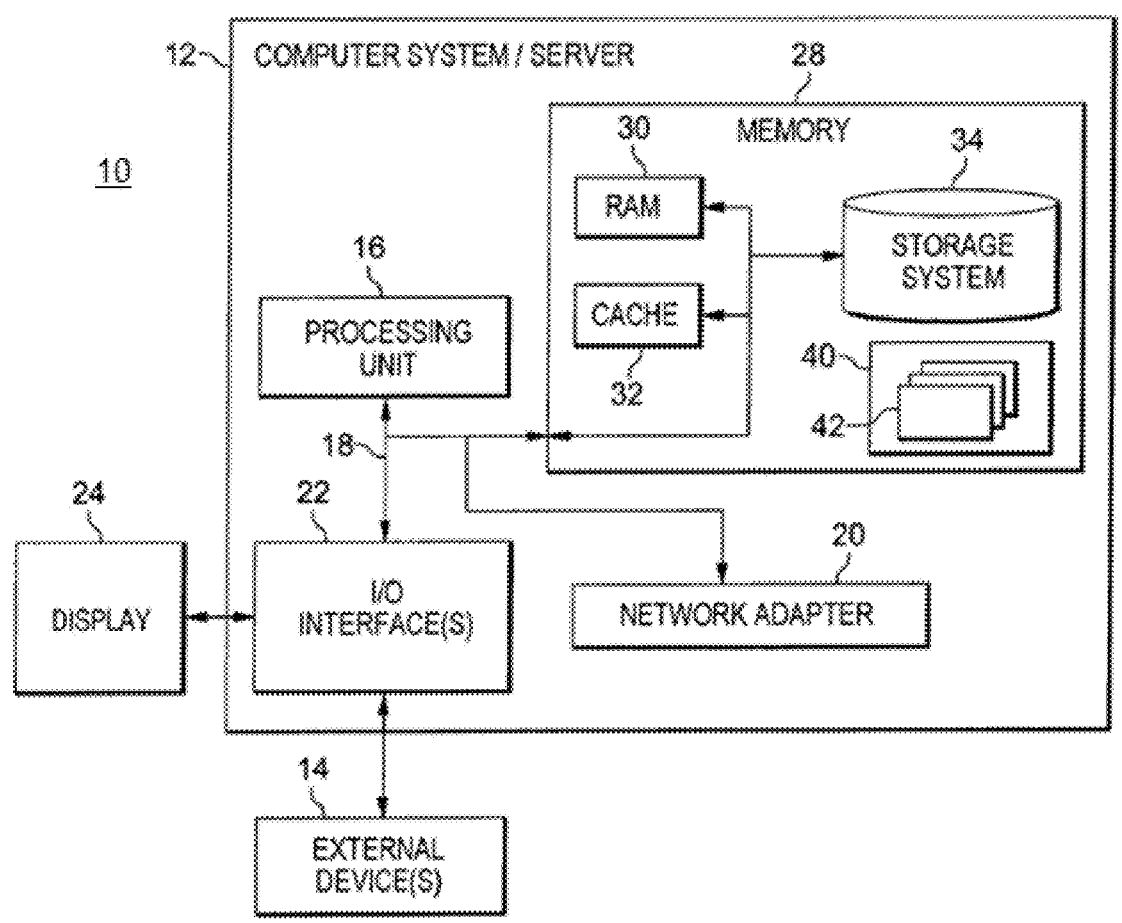
FIG. 7 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Various computing environments, including but not limited to, cloud computing environments employ microservices. The use of microservices in a computing environment enable the functionality attributed to complex applications to be implemented, instead, as simpler, independent, processes. One hinderance to the ease of microservice implementation is that there does not exist a practical method to identify where groupings of certain functionalities into a given microservice are inefficient. For example, presently, identifying various microservices which could be optimized by being merged into a single microservice is a manual undertaking. This need is realized because over time, in a given environment, multiple services may be executing which challenge the resources of the environment when a fewer microservices could provide the same functionality as the multiple services but would represent a better (more efficient) user of the environment's resources.

The number of services running in a given environment can accumulate over time and because there is no mechanism by which to identify which services can be merged. For example, microservices are often designed based on a business and/or domain requirement and using this requirement, an application is initially split into a large quantity of fine-grained services. If boundaries for business and/or domain were defined incorrectly, more services may be needed to correct this issue to provide the functionality needed by the users. Over time, additional microservices can also be added without any re-evaluation or redesign of the services already running in the environment, increasing further the number of services running in the environment. A larger number of services increases the complexity of the technical environment, increasing, as one example, deployment as well as management costs (e.g., tools, CI/CD (continuous integration and continuous delivery/deployment), release times, etc.). Thus, an understanding of which services could be merged to avoid the costs and inefficiencies related to the larger number of services would improve the functionality of the environment as a while. As discussed in greater detail herein, aspects of various embodiments of the present invention, automatically generate microservice merging recommendations and detailed analyses of the impacts of the proposed merging of services if implemented in a given technical environment. In some embodiments of the present invention, program code executing on one or more processors automatically merges recommended services into a merged microservice.

Embodiments of the present invention include a computer-implemented method, computer program product, and a computer system which address known issues with existing large and complex microservices based applications by including program code that generates practical merging recommendation and an analysis report. The analysis report provides details regarding the impacts of the recommended mergers on the computing environment into which the merged microservice will be deployed. Advantages of the approach disclosed herein include, but are not limited to: 1) program code that provides automatic recommendations for merging based on monitoring data; 2) program code that provides the aforementioned recommendations based on data without human intervention; 3) program code that provides insights to the architecture design (which can be implemented automatically, in some cases); and 4) program code that leverages existing deployment mechanisms to provide continuous optimization of the microservices available in a given technical environment. To this end, embodiments of the present invention provide a flexible method, computer program product, and system to proactively handle external dependent systems failure to complete end-end provision and avoid service interruption to end users. Automatically, and without any manual interventions, program code in embodiments of the present invention, executing on at least one processor, generate an impact analysis (which can be understood as a "what if" impact analysis). As such the program code can run as an automatic service within the technical environment and can implement proactive, automatic service relevance analyses and generate merging recommendations.

Embodiments of the present invention are inextricably tied to computing. Aspects of various embodiments of the present invention address a challenge unique to computing, i.e., streamlining functionalities provided in a technical environment, less efficiently, by multiple services and/or microservices, into providing these same functionalities, more efficiently, with fewer services or microservices. Both the issue addressed and the solution are inextricably tied to computing in that the issue arises and is unique to computing and the solution utilizes technical aspects of a computing infrastructure. In addition, the functionality of the computer program product, computer system, and computer-implemented method described herein represents a practical application of computing technology, i.e., the continuous automatic discovery and evaluation of merge opportunities for microservices deployed in a given technical environment to facilitate effective and efficient deployment of functionality into the technical environment.

Various aspects of embodiments of the present invention provide significantly more in improving efficiency and functionality in technical environments through optimization of microservices than existing techniques. Certain aspects which represent significant improvements, include, but are not limited to: 1) program code that targets complex microservice deployment environments by automatically performing analyses based on capturing relevant data (e.g., actual and observable data), including data from a scaling perspective, based on monitoring the technical environment, analyzing actual configuration data of the microservice orchestration platform, and analyzing historical data of this platform (rather than performing testing and/or simulation scenarios); 2) program code that generates an initial microservice communication network and captures and analyzes cross service communication relevancy to identify targets for further analysis; and 3) program code that merges microservices in a given environment using the aforementioned actual monitoring and configuration data.

Figure 2:
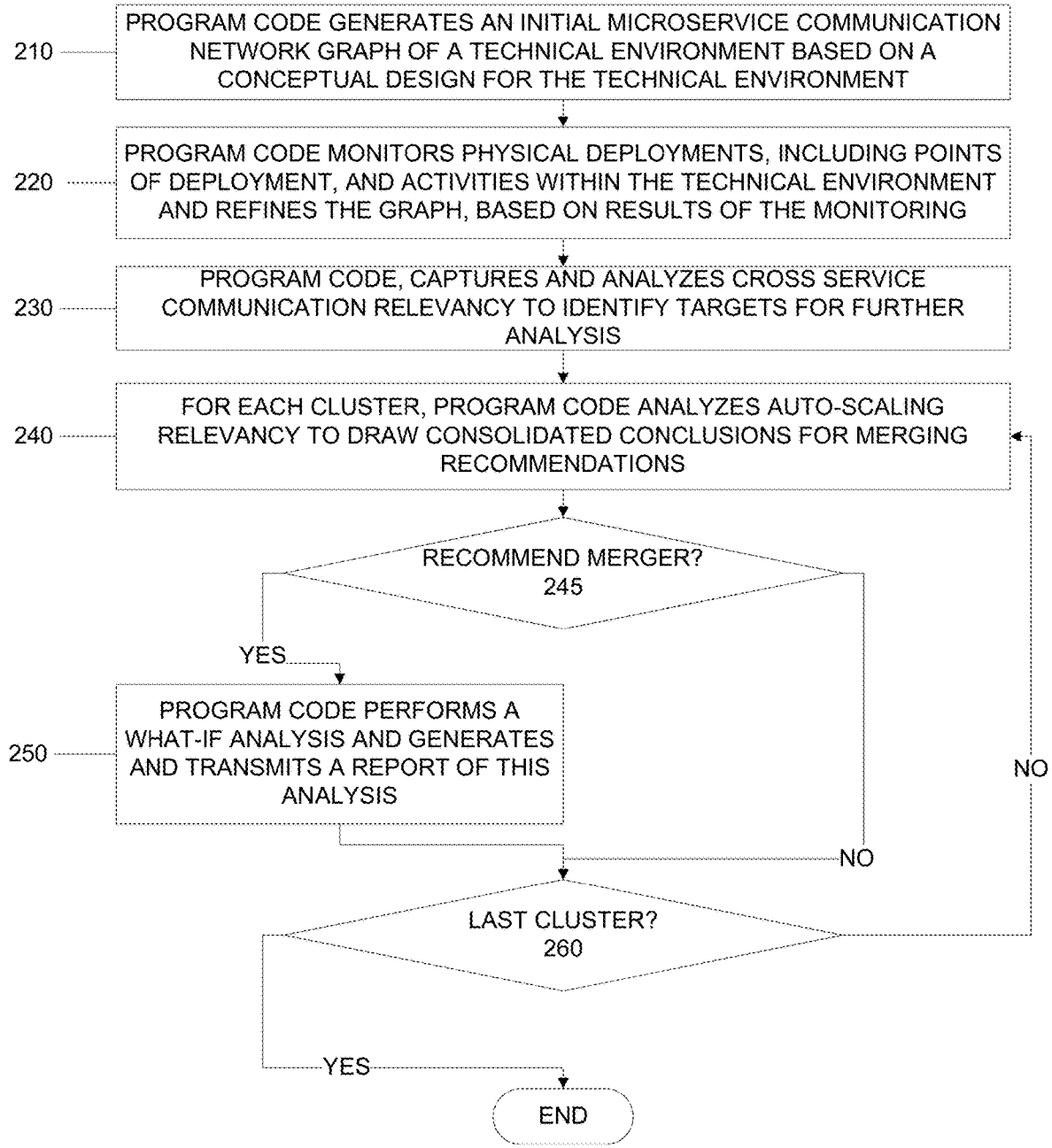
FIG. 2 depicts a workflow that includes various aspects of some embodiments of the present invention.

As illustrated herein, examples of the present invention include program code executing on one or more processors that: 1) generates automatic and fact-based relevance analyses (at an operational level) and merging recommendations; and 2) for each recommendation, generates what-if impact analysis (without any human/manual intervention). FIGS. 1-2 are both general workflows 100 200 that illustrates certain aspects of some embodiments of the present invention. FIGS. 1-2 provide overviews of various aspects of workflows 100 200 will be discussed in greater detail herein. FIGS. 1-2 both depict program code executing on one or more processors automatically determining which services and/or microservices can be merged into fewer microservices and what the impacts of these merges, if any, would be on the technical environment. In these examples, the program code generates both practical merging recommendations and what is referred to herein as a "what-if" analysis report (i.e., a report of the impacts of the proposed merger(s)).

Referring first to FIG. 1, in this workflow 100, the program code generates an initial microservice communication network graph of a technical environment based on a conceptual design for the technical environment (110). The program code monitors physical deployments, including points of deployment, and activities within the technical environment and refines the graph, based on results of the monitoring (120). The program code analyzes and defines various network clusters within the technical environment as units for recommendation analysis (130). For each cluster, the program code analyzes a relevance level and draws conclusions for recommendations (140). If the program code determines that a recommendation for merging should be made that is relevant to a given cluster (145), with each recommendation, the program code performs a what-if analysis and generates and transmits a report of this analysis (150). The program code performs the cluster analysis for each cluster it defined (160) and terminates when all clusters have been evaluated.

FIG. 2 also depicts a general workflow 200 performed by program code in some embodiments of the present invention. In some embodiments of the present invention, the program code generates an initial microservice communication network graph of a technical environment based on a conceptual design for the technical environment (210). In some examples, the program code generates this graph (or other representation of the communication network) based on design documents. The program code monitors physical deployments, including points of deployment, and activities within the technical environment and refines the graph, based on results of the monitoring (220). In this example, the program code monitors the technical environments using logs written by various systems and services executing within the environment. For example, the program code can refine the network graph and identify a target cluster based on latest changes identified via a log-based monitoring by the program code. The program code, in this example, captures and analyzes cross service communication relevancy to identify targets (e.g., clusters) for further analysis (230). The targets for further analysis can be understood as clusters (subsections of the network). For each target (e.g., cluster), the program code analyzes auto-scaling relevancy to draw consolidated conclusions for merging recommendations (240). Based on generating a given recommendation (as the program code may or may not recommend a merge based on various factors described herein (245)), the program code conducts a what-if analysis and provides a report (250). The program code performs the cluster analysis for each target (e.g., cluster) it defined (260) and terminates when all clusters have been evaluated.

As noted in FIGS. 1-2, in embodiments of the present invention, the program code identifies clusters of a given network. Once these clusters are identified, the program code determines whether to recommend merging microservices provided within the cluster. Each of these aspects is discussed in more detail below. The identification of the clusters, or communities to which nodes of a given network are assigned, is discussed in greater detail below.

As illustrated in FIGS. 1-2, the program code analyzes and defines various network clusters within the technical environment as units for recommendation analysis (e.g., 130, 230). To identify the clusters, in some examples, the program code utilizes what is understood as a Louvain modality method. Applying this methodology, the program code identifies and generates clusters of large and complex microservices in a given network or technical environment.

The Louvain method is an algorithm to detect clusters in large networks. Utilizing this method, the program code in embodiments of the present invention maximizes a modularity score for each cluster, where the modularity quantifies the quality of an assignment of nodes to clusters. Hence, the Louvain algorithm is a hierarchical clustering algorithm, that recursively merges clusters into a single node and executes the modularity clustering on the condensed graphs. In this method, the value that is optimized (herein by program code executing on one or more processors) is modularity. Modularity, as understood by one of skill in the art, is a measure of the structure of networks or graphs which measures the strength of division of a network into modules (e.g., clusters or communities). Networks with high modularity have dense connections between the nodes within modules but sparse connections between nodes in different modules. Modularity can be utilized in optimization methods for detecting cluster structure in the networks. Modularity can be represented as a scale value between −0.5 (non-modular clustering) and 1 (fully modular clustering) and measures the relative density of edges inside communities with respect to edges outside communities. Optimizing this value can result in a best possible grouping of the nodes of a given network. Hence, in embodiments of the present invention, the program code can apply this method, for example, to identify clusters for further analysis related to microservice merging. Modularity, as aforementioned, is a value in the range [−½, 1] that measures the density of links inside communities compared to links between communities. For a weighted graph, modularity is defined by Equation 1 below.

$$Q = \frac{1}{2m} \sum_{i,j} \left[ A_{ij} - \frac{k_i k_j}{2m} \right] \delta(c_i, c_j) \quad \text{(Equation 1)}$$

In Equation 1, $A_{ij}$ represents an edge weight between nodes i and j; $k_i$ and $k_j$ are the sum of the weights of the edges attached to nodes i and j, respectively; m is the sum of all of the edge weights in the graph; $c_i$ and $c_j$ are the communities of the nodes; $\delta$ is a Kronecker delta.

The program code in embodiments of the present invention applies the Louvain Method to maximize this value efficiently and it is applied by the program code in two phases that are repeated iteratively. Initially, each node in a given network (i.e., the technical environment) is assigned to its own cluster. For each node i, the change in modularity is calculated for removing i from its own cluster and moving it into the cluster of each neighbor j of i. This value is calculated by two steps: 1) the program code removes i from its original cluster; and 2) the program code inserts i into the cluster of j. These aspects are illustrated in Equation 2 below.

$$\Delta Q = \left[ \frac{\sum_{in} + k_{i,in}}{2m} - \left( \frac{\sum_{tot} + k_i}{2m} \right)^2 \right] - \left[ \frac{\sum_{in}}{2m} - \left( \frac{\sum_{tot}}{2m} \right)^2 - \left( \frac{k_i}{2m} \right)^2 \right] \quad \text{(Equation 2)}$$

$$= \frac{1}{2m} \left( k_{i,in} - \frac{\sum_{tot} k_i}{m} \right)$$

In Equation 2, $\Sigma_{in}$ is sum of all the weights of the links inside the cluster i moving into. $\Sigma_{tot}$ is the sum of all the weights of the links to nodes in the cluster i is moving into. The value $k_i$ is the weighted degree of i. The value $k_{i,\ in}$ is the sum of the weights of the links between i and other nodes in the cluster that i is moving into. Meanwhile, m is the sum of the weights of all links in the network (e.g., technical environment).

FIG. 3 is a workflow 300 of a process in which the program code determines, applying the Louvain method, to which cluster each node should be assigned. Referring to FIG. 3, the program code assigns each node in a given network to a cluster which increases its modularity the most, hence, optimizing modularity (310). In some cases, the program code keeps a given node in an initial cluster. Once the program code calculates ΔQ for all clusters i is connected to, the program code assigns i to the cluster that resulted in the greatest modularity increase (ΔQ) (this can mean keeping the cluster assignment the same). If there is no increase based on the calculation, the program code retains the node, i, in its original cluster. This process is applied repeatedly and sequentially to all nodes until no modularity increase can occur. Once this local maximum of modularity is hit, the first phase has ended.

Returning to FIG. 3, the program builds a new network where nodes are in the clusters that optimize modularity (as determined in 310) (320). The program code represents any links between nodes of the same cluster using self-loops on the new cluster node and links from multiple nodes in the same cluster to a node in a different cluster by utilizing weighted edges between clusters. The process of optimizing modularity is iterative as various aspects of the network and the nodes can change based on internal and internal network changes. Thus, utilizing the new cluster groups, the program will continue to assign each node in a given network to a cluster which increases its modularity the most, hence, optimizing modularity (310). This process can thus be iterative.

In some embodiments of the present invention, rather than iteratively work through all the clusters in a given network (e.g., technical environment), the program code refines the clustering by re-evaluating portions of the network based on latest changes having been implemented in those portions of the network. For example, the program code can monitor the logs for the network. The program code can target certain potions of a given technical environment for the modality analysis illustrated in FIG. 3. Thus, in some embodiments of the present invention, when the program code assigns each node in a given network to a cluster which increases its modularity the most, hence, optimizing modularity (310), the program code generates a network graph to reflect the assignments. When the program code determines, based on analyzing logs, that certain clusters are the targets of changes, the program code captures and analyzes cross service communication relevancy to identify these target clusters for further analysis. The further analysis can include building a new network where nodes are in the clusters the optimize modularity (as determined in 310).

Once the program code has identified the clusters, and in some cases, certain target clusters (based on recent changes in the technical environment), the program code can determine whether services within a given cluster should be merged. To determine whether to recommend a merge, the program code utilizes actual service communication statistics (e.g., inter-service calls to fulfill specific end-user scenarios) to determine basic service communication coupling metrics. The program code then captures service auto-scaling relevance data to determine relevancy from an operational perspective. In some embodiments of the present invention, the program code leverages accumulated historical data for further pattern recognition. In some embodiments of the present invention, a more relevant service or cluster would be a service that, if it did not operate as expected, would impact more users and/or the functionality and/or operability of a technical environment more severely. In some embodiments of the present invention, relevancy is a measure of how connected two or more microservices are to each other, thus, a higher relevancy would cause the program code to generate a merger recommendation. In some examples, relevancy is rated with a pre-configured level, based on pre-established metrics related to usage of the service within the technical environment.

One non-limiting example of pre-configured relevancy levels which can be utilized in embodiments of the present invention is pod (i.e., microservice) affinity and anti-affinity. This affinity refers to the rules or preferences applied on a microservice level. Affinity is utilized in technical environments as part of rules (i.e., pod affinity rules) to schedule microservices on some node in a given network by matching a specified condition in more expressive methods. Pod affinity or anti-affinity allows for the creation or decision not to create new microservices on the nodes based on the labels on other microservices in that node. Generally, the microservices (pod) scheduled on same node with configured affinity rules should have similar resource requirements (CPU, RAM, Storage, etc.) and may utilize frequent communication. Thus, pods configured with affinity rules would have a higher relevancy than those configured with anti-affinity rules.

FIG. 4 is a table 400 that illustrates a basic example of how the program code identifies services for merger recommendations in a target cluster. In the illustrated (non-limiting) example, for a given target cluster, the program code utilizes actual service communication statistics (e.g., inter-service calls to fulfill specific end-user scenarios) to determine basic service communication coupling metrics. In this example, the program code analyzes services A and B and services B and C, utilizing inter-communication, service calls to a common third party, and service calls to common data. Additionally, the program code captures service auto-scaling relevance data to determine relevancy from an operational perspective. In this example, the program code determines for services A and B and services B and C times of auto-scaling up concurrently, time of auto-scaling down concurrently, and whether there is an auto-scaling trigger (e.g., CPU, memory). Based on both the analysis and the determinations, the program code assigns a relevancy score and if the relevancy score reaches a pre-determined threshold, the program code recommends a merger of the services.

Figure 5:
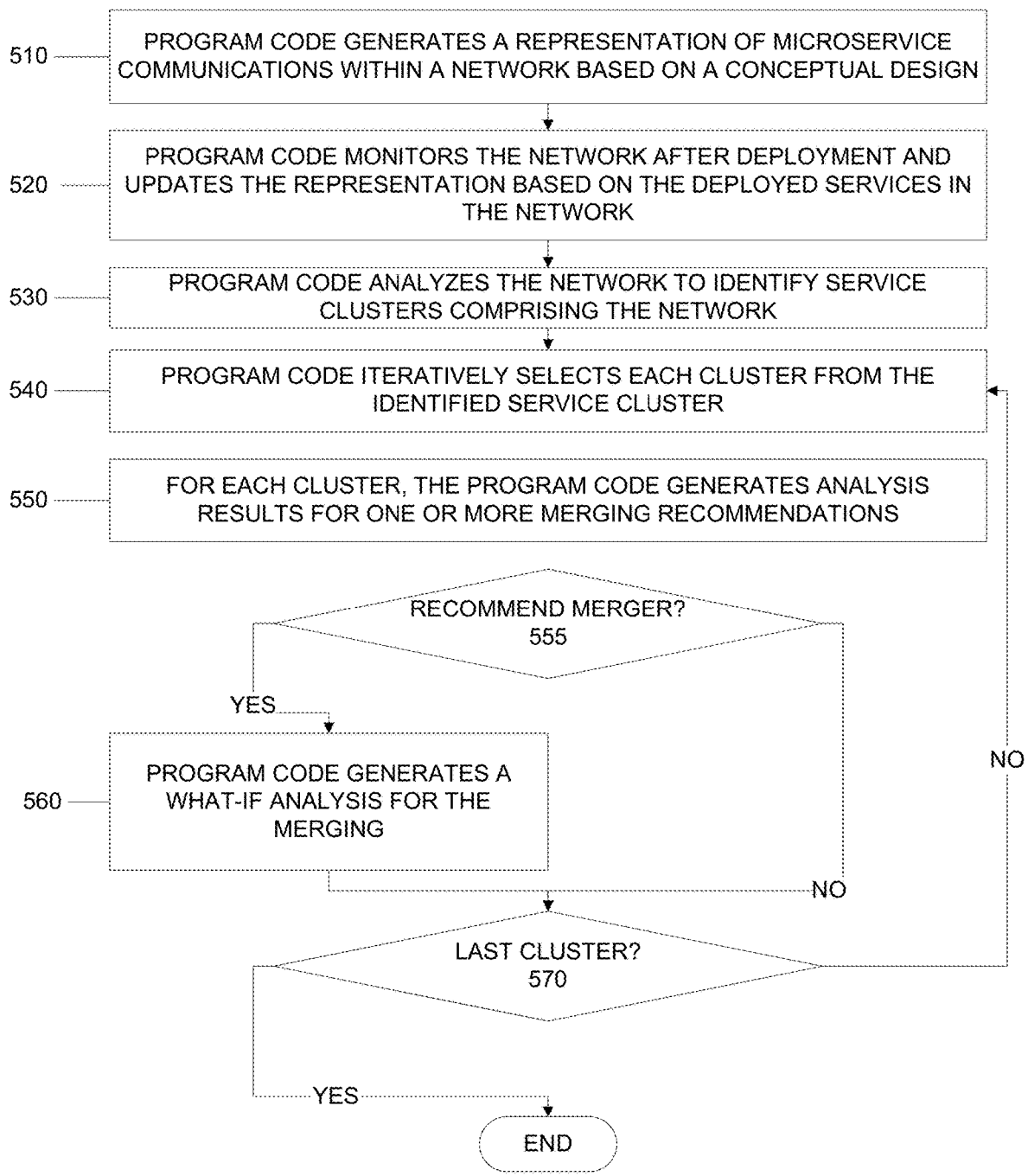
FIG. 5 depicts a workflow that includes various aspects of some embodiments of the present invention.

FIG. 5 is a workflow 500 that details various aspects that have been illustrated in certain of the earlier figures. In some embodiments of the present invention, the program code generates a representation of microservice communications within a network based on a conceptual design (510). In some examples, the conceptual design is obtained by the program code from various architecture documents. The program code monitors the network after deployment and updates the representation based on the deployed services in the network (520). The program code analyzes the network to identify service clusters comprising the network (530) (e.g., FIGS. 1-3). The program code iteratively selects each cluster from the identified service cluster (540) and for each cluster, the program code generates analysis results for one or more merging recommendations (550). If there are no merging recommendations for a given cluster (555), and there are additional clusters that have not been analyzed (570), the program code continues with the next cluster (540). If the program code generates a recommendations (560), for each recommendation generated for a given cluster, the program code generates a what-if analysis for the merging (560). The program code then proceeds to the next cluster (570) provided there are still additional clusters to analyze. When the clusters have all been analyzed in this manner, the process ends. If additional clusters have not been analyzed, the process continues until all identified clusters have been analyzed and the program code has generated merging recommendations and, if relevant, what-if analyses.

Figure 6:
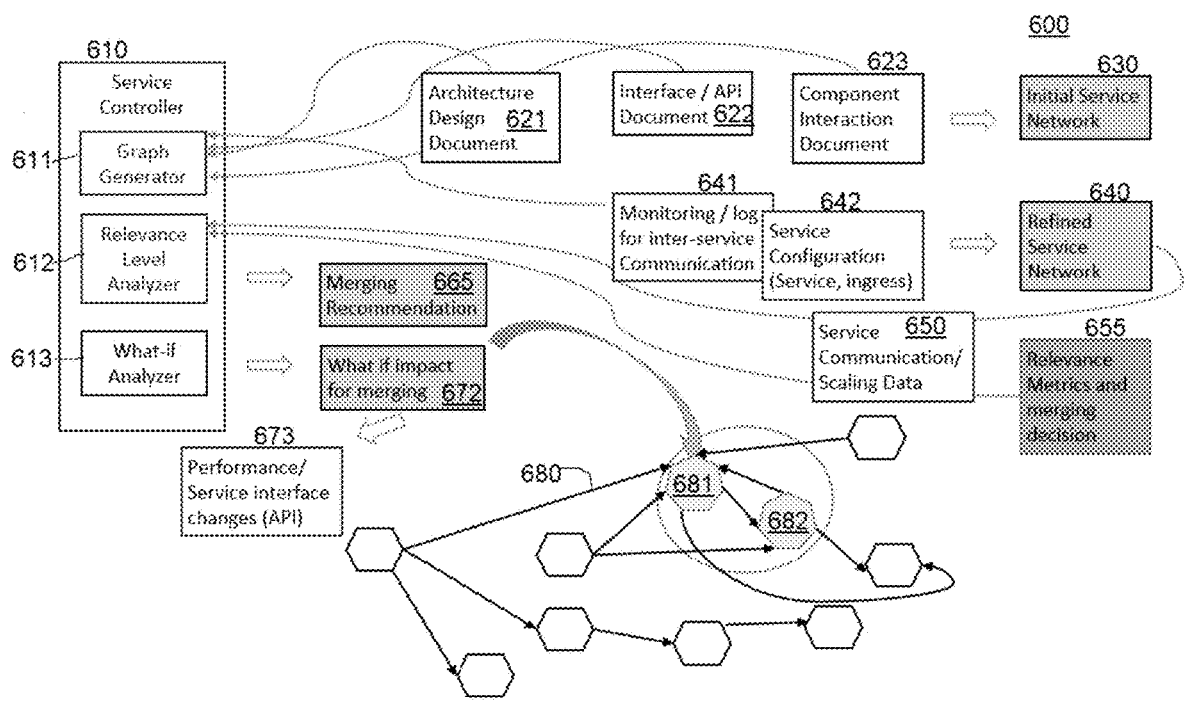
FIG. 6 depicts a technical architecture that includes various aspects of some embodiments of the present invention.

FIG. 6 illustrates an overall technical architecture 600 of some embodiments of the present invention. For ease of understanding, certain functionalities of the program code in some embodiments of the present invention are separated into modules. These modules represent a single, non-limiting, configuration of different aspects performed by the program code in various embodiments of the present invention. These designations were selected for illustrative purposes and ease of understanding and not to suggest any limitations to distribution of operations within embodiments of the present invention.

Referring to FIG. 6, a service controller 610 includes a graph generator 611, a relevance level analyzer 612, and a what-if analyzer 613. The program code comprising the graph generator 611, generates a representation a network, first, from one or more documents 620, including but not limited to architecture design documents 621, interface/API documents 622, and/or component interaction documents 623. Thus, the program code of the graph generator 611 generates a graph or other representation or model of the initial service network 630. The modeling includes the identification of service clusters.

The program code if the graph generator 611 produced a refined graph 640 by monitoring services once deployed into the network 640, including but not limited to, monitoring logs for inter-service communication 641, and analyzing service configurations (e.g., service, ingress, etc.) 642. Meanwhile, the program code of the relevance level analyzer 612 assigns a relevance score to possible mergers within a target cluster by utilizing service communication and scaling data 650 to determine basic service communication coupling metrics and capture service auto-scaling relevance, including but not limited to leveraging accumulated historical data for further pattern recognition. The analyses of the program code comprising the graph generator 611 and the program code comprising the relevance level analyzer 612 combines such that the program code generates a refined graph or other model of the service network 640. The refinement of the model may reflect changed to the identified service clusters.

Based on the refined graph or other model of the service network 640, the program code of the relevance level analyzer 612 makes merger recommendations 655, 665 (or not) by individually targeting each cluster of the identified (refined) service clusters. Based on making merger recommendations 665 the program code comprising the what-if analyzer 613, performs an analysis 672 of the recommended mergers to determine performance and/or interface and/or API changes 673. The program code provides a report summarizing these impacts to a user and/or administrator. In some embodiments, based on this report, the program code can automatically merge certain services for a future deployment to the target cluster(s). In FIG. 6, for illustrative purposes only, the network cluster 660 is depicted with two microservices 681, 682, that the program code has recommended for being merged in this technical environment.

Embodiments of the present invention include a computer-implemented method, a computer program product, and a computer system where program code executing on one or more processors generates, based on at least one design specification, a representation of microservice communications within a network. The program code updates the representation, based on monitoring deployments of microservices within the network. The program code identifies individual service clusters within the network. The program code selects, by the one or more processors, each cluster from the identified service clusters, and for each cluster, evaluating, based on discovering relationships between microservices deployed to each cluster, whether to recommend mergers of a portion of the microservices deployed to each cluster. The program code recommends at least one merger for a given cluster of the identified services clusters. Based on the recommending, for the given cluster, the program code generates a what-if analysis for the at least one merger.

In some embodiments of the present invention, the program code transmits the what-if analysis for the at least one merger to a service controller within the network.

In some embodiments of the present invention, the program code deploys an update to the given cluster, where the update comprises the at least one merger.

In some embodiments of the present invention, the program code where identifying the individual service clusters within the network comprises: the program code assigning each node of nodes comprising the network to a service cluster, the program code calculating a change in modularity for each node based on removing each node from its assigned cluster and moving the node into each neighboring cluster in the network, and the program code optimizing each cluster.

In some embodiments of the present invention, the program code optimizing each cluster comprises the program code, based on a greater modularity existing for the node in its assigned cluster, retaining the node in its assigned cluster. Based on a greater modality existing for the node based on moving the node to a neighboring cluster, the program code re-assigns the node to the neighboring cluster.

In some embodiments of the present invention, the program code discovering relationships between microservices deployed to each cluster, further comprises, for each cluster: the program code utilizing actual service communication statistics to determine basic service communication coupling metrics for two or more microservices deployed to the cluster.

In some embodiments of the present invention, the actual service communication statistics comprise inter-service calls to fulfill specific end-user scenarios.

In some embodiments of the present invention, the program code discovering relationships between microservices deployed to each cluster, further comprises, for each cluster and for each microservice deployed to each cluster: the program code analyzing a first microservice deployed to the cluster in view of a second microservice deployed to the cluster, elements comparing the first microservice to the second microservice, the elements selected from the group consisting of: inter-communication between the first microservice and the second microservice, service calls to a common third party by the first microservice and the second microservice, and service calls to common data by the first microservice and the second microservice. The program code captures for the first microservice and the second microservice, service auto-scaling relevance data, to determine relevancy to the network from an operational perspective for the first microservice and the second microservice. The program code assigns a relevancy score to a combination of the first service and the second service.

In some embodiments of the present invention, the recommending is based on the relevancy score exceeding a predefined threshold.

In some embodiments of the present invention, assigning the relevancy score is based on analyzing accumulated historical data for the first microservice and the second microservice for further pattern recognition.

In some embodiments of the present invention, one or more of the first microservice and the second microservice comprise two or more microservices.

In some embodiments of the present invention, the selecting is iterative.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more of the elements of the technical architecture 600, including but not limited to the service controller 610, and the clusters 681, 682, can each comprise a cloud computing node 10 (FIG. 7) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
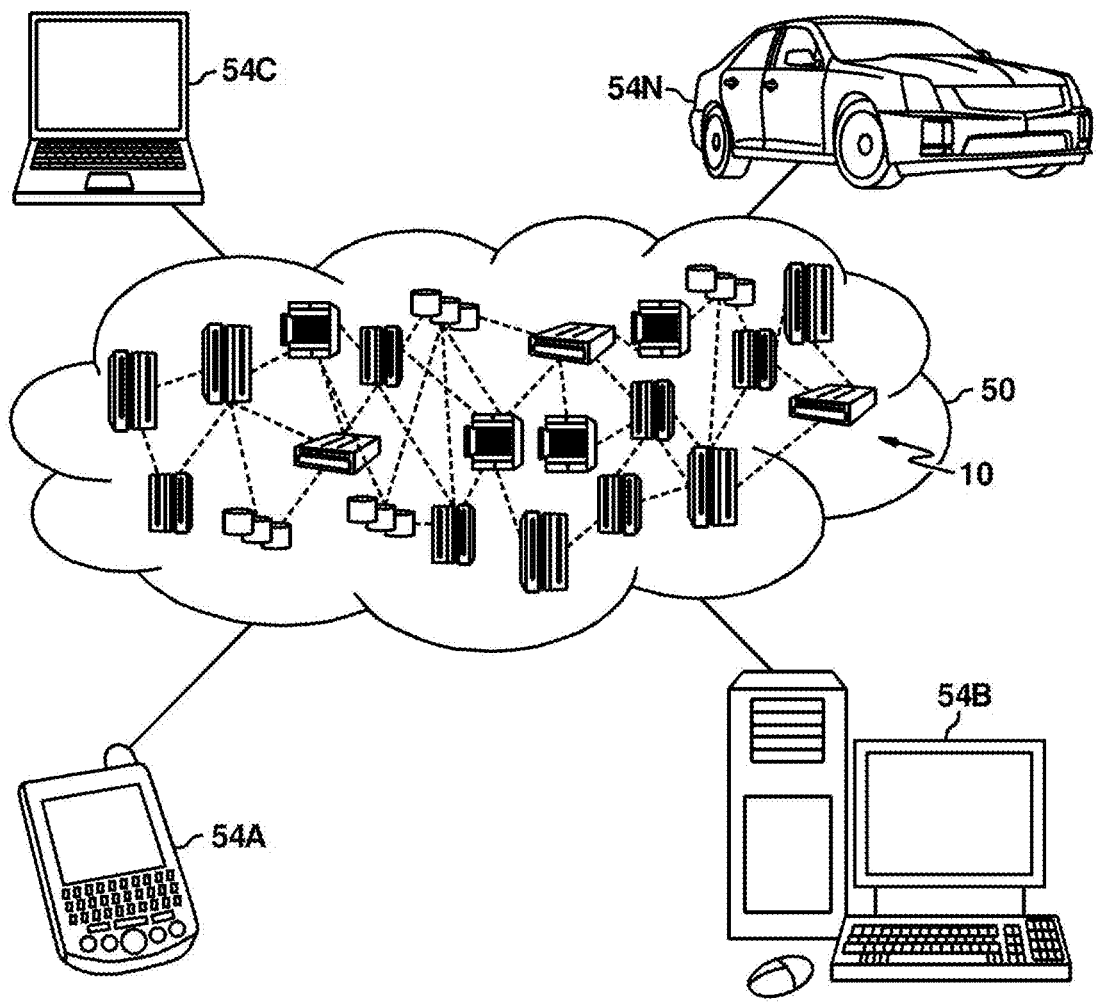
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
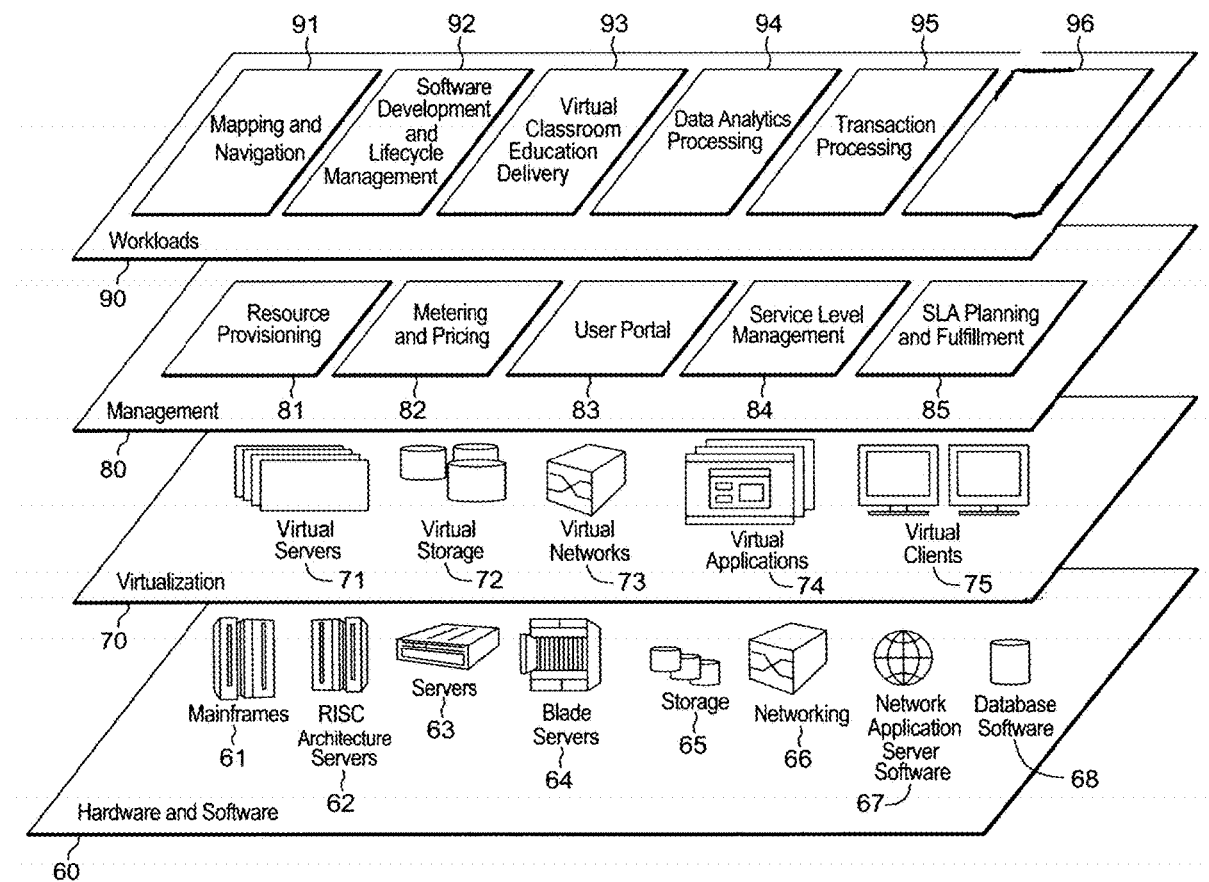
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommending and/or merging microservices and determining outcomes for these mergers 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
generating, by one or more processors, based on at least one design specification, a representation of microservice communications within a network;
updating, by the one or more processors, the representation, based on monitoring deployments of microservices within the network;
utilizing, by the one or more processors, the updated representation to identify individual service clusters within the network, wherein the identifying is based on utilizing log-based monitoring of program code comprising the microservices to identify the individual service clusters as service clusters in the network with latest changes and to identify cross-service communication relevancy between the microservices, wherein identifying the cross-communication relevancy comprises analyzing actual service communication statistics comprising inter-service calls to fulfill specific end-user scenarios to determine basic service communication coupling metrics, and wherein the individual service clusters comprise nodes configured with affinity rules;

facilitating, by the one or more processors, an iterative process to determine whether to recommend at least one merger for each cluster from the identified service clusters, wherein the facilitating comprises determining whether to recommend the at least one merger for a preceding cluster of the identified service clusters before initiating the process for the next cluster of the identified service clusters, the process comprising, for each cluster:

selecting, by the one or more processors, the cluster from the identified service clusters;

evaluating, based on discovering relationships between microservices deployed to the cluster, whether to recommend mergers of a portion of the microservices deployed to the cluster; and based on the evaluating, recommending, by the one or more processors, at least one merger for the cluster or not recommending the at least one merger for the cluster, wherein the recommending comprises generating a what-if analysis for the at least one merger, wherein the recommending of the at least one merger is based in part on the updated representation indicating a high communication relevancy between one or more microservices comprising the portion of the microservices.

2. The computer-implemented method of claim 1, further comprising:
transmitting, by the one or more processors, the what-if analysis for the at least one merger to a service controller within the network.

3. The computer-implemented method of claim 1, further comprising:
deploying, by the one or more processors, an update to the cluster, wherein the update comprises the at least one merger.

4. The computer-implemented method of claim 1, wherein identifying the individual service clusters within the network comprises:
assigning, by the one or more processors, each node of nodes comprising the network to a service cluster;
calculating, by the one or more processors, a change in modularity for each node based on removing each node from its assigned cluster and moving the node into each neighboring cluster in the network; and
optimizing, by the one or more processors, each cluster.

5. The computer-implemented method of claim 4, wherein the optimizing comprises:
based on a greater modularity existing for the node in its assigned cluster, retaining the node in its assigned cluster; and
based on a greater modality existing for the node based on moving the node to a neighboring cluster, re-assigning the node to the neighboring cluster.

6. The computer-implemented method of claim 1, wherein discovering relationships between microservices deployed to the cluster, further comprises, for each cluster:
utilizing, by the one or more processors, actual service communication statistics to determine basic service communication coupling metrics for two or more microservices deployed to the cluster.

7. The computer-implemented method of claim 4, wherein the actual service communication statistics comprise inter-service calls to fulfill specific end-user scenarios.

8. The computer-implemented method of claim 1, wherein discovering relationships between microservices deployed to the cluster, further comprises, for the cluster and for each microservice deployed to the cluster:
analyzing, by the one or more processors, a first microservice deployed to the cluster in view of a second microservice deployed to the cluster, elements comparing the first microservice to the second microservice, the elements selected from the group consisting of:
inter-communication between the first microservice and the second microservice, service calls to a common third party by the first microservice and the second microservice, and service calls to common data by the first microservice and the second microservice;
capturing, by the one or more processors for the first microservice and the second microservice, service auto-scaling relevance data, to determine relevancy to the network from an operational perspective for the first microservice and the second microservice; and
assigning, by the one or more processors, a relevancy score to a combination of the first service and the second service.

9. The computer-implemented method of claim 8, wherein the recommending is based on the relevancy score exceeding a predefined threshold.

10. The computer-implemented method of claim 8, wherein assigning the relevancy score is based on analyzing, by the one or more processors, accumulated historical data for the first microservice and the second microservice for further pattern recognition.

11. The computer-implemented method of claim 8, wherein one or more of the first microservice and the second microservice comprise two or more microservices.

12. The computer-implemented method of claim 1, wherein analyzing the actual service communication statistics comprises analyzing intercommunication between the individual service clusters, service calls to a common third party, and service calls to common data.

13. A computer program product comprising:
a computer readable storage medium readable by one or more processors of a shared computing environment comprising a computing system and storing instructions for execution by the one or more processors for performing a method comprising:
generating, by the one or more processors, based on at least one design specification, a representation of microservice communications within a network;
updating, by the one or more processors, the representation, based on monitoring deployments of microservices within the network;
utilizing, by the one or more processors, the updated representation to identify individual service clusters within the network, wherein the identifying is based on utilizing log-based monitoring of program code comprising the microservices to identify the individual service clusters as service clusters in the network with latest changes and to identify cross-service communication relevancy between the microservices, wherein identifying the cross-communication relevancy comprises analyzing actual service communication statistics comprising inter-service calls to fulfill specific end-user scenarios to determine basic service communication coupling metrics, and wherein the individual service clusters comprise nodes configured with affinity rules;

facilitating, by the one or more processors, an iterative process to determine whether to recommend at least one merger for each cluster from the identified service clusters, wherein the facilitating comprises determining whether to recommend the at least one merger for a preceding cluster of the identified service clusters before initiating the process for the next cluster of the identified service clusters, the process comprising, for each cluster:

selecting, by the one or more processors, the cluster from the identified service clusters;

evaluating, based on discovering relationships between microservices deployed to the cluster, whether to recommend mergers of a portion of the microservices deployed to the cluster; and based on the evaluating, recommending, by the one or more processors, at least one merger for the cluster or not recommending the at least one merger for the cluster, wherein the recommending comprises generating a what-if analysis for the at least one merger, wherein the recommending of the at least one merger is based in part on the updated representation indicating a high communication relevancy between one or more microservices comprising the portion of the microservices.

14. The computer program product of claim 13, further comprising:

transmitting, by the one or more processors, the what-if analysis for the at least one merger to a service controller within the network.

15. The computer program product of claim 13, wherein identifying the individual service clusters within the network comprises:

assigning, by the one or more processors, each node of nodes comprising the network to a service cluster;

calculating, by the one or more processors, a change in modularity for each node based on removing each node from its assigned cluster and moving the node into each neighboring cluster in the network; and optimizing, by the one or more processors, each cluster.

16. The computer program product of claim 15, wherein the optimizing comprises:

based on a greater modularity existing for the node in its assigned cluster, retaining the node in its assigned cluster; and based on a greater modality existing for the node based on moving the node to a neighboring cluster, re-assigning the node to the neighboring cluster.

17. The computer program product of claim 13, wherein discovering relationships between microservices deployed to the cluster, further comprises, for the cluster:

utilizing, by the one or more processors, actual service communication statistics to determine basic service communication coupling metrics for two or more microservices deployed to the cluster.

18. The computer program product of claim 15, wherein the actual service communication statistics comprise inter-service calls to fulfill specific end-user scenarios.

19. The computer program product of claim 13, wherein discovering relationships between microservices deployed to the cluster, further comprises, for the cluster and for each microservice deployed to the cluster:

analyzing, by the one or more processors, a first microservice deployed to the cluster in view of a second microservice deployed to the cluster, elements comparing the first microservice to the second microservice, the elements selected from the group consisting of: inter-communication between the first microservice and the second microservice, service calls to a common third party by the first microservice and the second microservice, and service calls to common data by the first microservice and the second microservice;

capturing, by the one or more processors for the first microservice and the second microservice, service auto-scaling relevance data, to determine relevancy to the network from an operational perspective for the first microservice and the second microservice; and assigning, by the one or more processors, a relevancy score to a combination of the first service and the second service.

20. A computer system comprising:

a memory;

one or more processors in communication with the memory;

program instructions executable by the one or more processors in a shared computing environment of a computing system via the memory to perform a method, the method comprising:

generating, by the one or more processors, based on at least one design specification, a representation of microservice communications within a network;

updating, by the one or more processors, the representation, based on monitoring deployments of microservices within the network;

utilizing, by the one or more processors, the updated representation to identify individual service clusters within the network, wherein the identifying is based on utilizing log-based monitoring of program code comprising the microservices to identify the individual service clusters as service clusters in the network with latest changes and to identify cross-service communication relevancy between the microservices, wherein identifying the cross-communication relevancy comprises analyzing actual service communication statistics comprising inter-service calls to fulfill specific end-user scenarios to determine basic service communication coupling metrics, and wherein the individual service clusters comprise nodes configured with affinity rules;

facilitating, by the one or more processors, an iterative process to determine whether to recommend at least one merger for each cluster from the identified service clusters, wherein the facilitating comprises determining whether to recommend the at least one merger for a preceding cluster of the identified service clusters before initiating the process for the next cluster of the identified service clusters, the process comprising, for each cluster:

selecting, by the one or more processors, the cluster from the identified service clusters;

evaluating, based on discovering relationships between microservices deployed to the cluster, whether to recommend mergers of a portion of the microservices deployed to the cluster; and based on the evaluating, recommending, by the one or more processors, at least one merger for the cluster or not recommending the at least one merger for the cluster, wherein the recommending comprises generating a what-if analysis for the at least one merger, wherein the recommending of the at least one merger is based in part on the updated representation indicating a high communication relevancy between one or more microservices comprising the portion of the microservices.

\* \* \* \* \*